(12) United States Patent
Erny

(10) Patent No.: US 6,521,686 B1
(45) Date of Patent: Feb. 18, 2003

(54) AQUEOUS CERAMIC CASTING MATERIAL, METHOD FOR PRODUCING SAID CASTING MATERIAL AND USE OF THE SAME

(75) Inventor: Tobias Erny, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/857,787

(22) PCT Filed: Jan. 3, 2000

(86) PCT No.: PCT/DE00/00020

§ 371 (c)(1),
(2), (4) Date: Jun. 11, 2001

(87) PCT Pub. No.: WO00/43328

PCT Pub. Date: Jul. 27, 2000

(30) Foreign Application Priority Data

Jan. 20, 1999 (DE) .......................................... 199 02 157

(51) Int. Cl.⁷ ............................. C08J 3/00; C08K 3/20; C08K 3/10; C08L 75/00; B05D 3/02

(52) U.S. Cl. ........................ 524/413; 524/507; 524/591; 524/839; 524/840; 427/372.2; 427/385.5

(58) Field of Search .................................. 524/507, 591, 524/839, 840, 413; 427/372.2, 385.5

(56) References Cited

FOREIGN PATENT DOCUMENTS

| DE | 196 15 400 | 10/1997 |
|----|------------|---------|
| WO | WO 94/07808 | 4/1994 |

*Primary Examiner*—Patrick D. Niland
(74) *Attorney, Agent, or Firm*—Young & Thompson

(57) ABSTRACT

The invention relates to an aqueous ceramic casting compound which includes a binder made from polyurethane. The casting compound is suitable for producing a very thin ceramic green sheet with a thickness of up to 1 μm. A mechanical property of the green sheet, such as its modulus of elasticity and tensile strength, can be influenced in a controlled manner with the aid of the binder, so that it is possible for the green sheet to be reliably processed further. A green sheet of this type can be used, for example, to produce a multilayer capacitor with a high capacitance and a low overall height.

7 Claims, No Drawings

AQUEOUS CERAMIC CASTING MATERIAL, METHOD FOR PRODUCING SAID CASTING MATERIAL AND USE OF THE SAME

FIELD OF THE INVENTION

The invention relates to a ceramic casting compound (slip), which includes a ceramic powder, an aqueous dispersion medium and a binder. A casting compound of this type is known from WO 94/07808. In addition to the casting compound, a process for producing the casting compound and a use of the casting compound are described.

BACKGROUND OF THE INVENTION

A ceramic casting compound is used, for example, to produce a ceramic green sheet. A casting compound with an aqueous dispersion medium is preferred with a view to ecological compatibility. The ceramic casting compound which is described in WO 94/07808 and is suitable for producing a ceramic green sheet has as its binder an emulsion copolymer of an acrylate and/or methacrylate.

Ceramic green sheets are used to produce a ceramic multilayer body, for example a multilayer capacitor. To do this, a plurality of green sheets, which may have been metallized, are stacked on top of one another, are laminated, the binder is removed and the sheets are sintered together. Green sheets which are as thin as possible are used in order to reduce the overall size of the multilayer body. In addition, thin green sheets allow a capacitance of the capacitor to be increased in the case of a multilayer capacitor.

For a green sheet to be reliably processed, a low modulus of elasticity (high flexibility) and, at the same time, an appropriate tensile strength are advantageous mechanical properties of the green sheet.

SUMMARY OF THE INVENTION

It is an object of the invention to provide a ceramic casting compound having an aqueous dispersion medium, with the aid of which it is possible to produce a thin ceramic green sheet which, moreover, has sufficient elasticity and appropriate tensile strength for further processing.

To achieve. the object, the invention describes a ceramic casting compound which includes a ceramic powder, an aqueous dispersion medium and a binder, characterized in that the binder includes polyurethane.

A suitable binder is polyurethane, which is used, for example, for the production of a polyurethane foam, an adhesive or a paint.

A chain of a polyurethane is highly flexible on account of its molecular structure. Moreover, crosslinking between the chains allows the green sheet produced with the aid of the polyurethane to have a tensile strength which is suitable for further processing of the green sheet. In this way, it is possible to produce a very thin green sheet which has the desired mechanical properties and therefore can be reliably processed further. A thin green sheet may in particular be processed on its own, i.e. without a support such as a plastic sheet. It is not necessary to specifically influence the mechanical properties of a green sheet, for example by incorporating a soft substituent of a polymer binder, in order to reduce its glass transition temperature. It is also possible to dispense with a plasticizer as a casting compound additive.

In a particular embodiment of the invention, the binder includes a copolymer. By way of example, the binder is an emulsion copolymer of a polyacrylate and a polyurethane. Cellulose, polyacrylamide, polyvinyl alcohol and/or styrene may also form a further constituent of the copolymer.

A specific property of the binder (for example the solubility of the binder in water) can be altered in a controlled way by using a monomer with a suitable functional group.

A further advantage of the invention is that a binder made from polyurethane can be mixed with a further binder. This further binder may in particular include polyacrylate. In this case, it is particularly advantageous if the binder has a similar pH stability.

In particular, the casting compound has a binder with a molar weight from a range between 10,000 and 120,000 g/mol.

The binder is preferably in the form of a microsphere with a mean particle size from a range between 20 and 300 nm, a particle size of below 100 nm being possible in particular with a polyurethane. This particle size means that the polyurethane is readily soluble in water, thus ensuring high stability of the casting compound. Solid constituents remain uniformly distributed in the casting compound, i.e. there is no sedimentation (gravitational separation). Moreover, a small particle size of the binder makes it possible to achieve a high green density in a ceramic green body.

In a particular configuration, the casting compound has a pH from a range between 5 and 10. In this range, a polyurethane is stable, i.e. it does not tend, for example, to form agglomerates. There is no need for an additional stabilizer for the polyurethane.

The ceramic powder of the casting compound has at least one material which is selected from the group consisting of boron, carbon, oxygen, sulfur, nitrogen, lithium, sodium, potassium, beryllium, magnesium, calcium, strontium, barium, aluminum, gallium, indium, titanium, zirconium, bismuth and/or manganese. In particular, the ceramic powder includes barium titanate. Barium titanate is used primarily as a dielectric in multilayer capacitors.

To achieve the object, a process for producing a ceramic casting compound which includes a ceramic powder, an aqueous dispersion medium and a binder with polyurethane is also described. For this purpose, an aqueous dispersion of the ceramic powder and an aqueous dispersion of the binder are mixed.

A ceramic casting compound described here is used to produce a ceramic green body, for example a green sheet. The casting compound can be used in particular to produce a green sheet which has a thickness from a range between 1 and 30 $\mu$m.

A thin green sheet which includes, for example, barium titanate as ceramic powder can be used to produce a multilayer capacitor of high capacitance and low overall height.

To summarize, the following important advantages are associated with a polyurethane as a binder for a ceramic casting compound:

- A casting compound with an aqueous dispersion medium can be used in a ceramic production process.
- When removing the binder from a ceramic green body which has been produced from the casting compound, complete, residue-free combustion (decarburization) of the polyurethane takes place.
- In the case of a polyurethane, a glass transition temperature $T_g$ is so low that the minimum film-formation temperature of the casting compound is not exceeded. This is beneficial with regard to a good mechanical property of a green sheet for further processing.

A polyurethane has a relatively high solubility in water. This leads to a stable casting compound with a high green density.

A polyurethane can readily be combined with another binder (multicomponent binder).

Monomers of a polyurethane can readily be subjected to copolymerization. It is thus possible to specifically influence a property of a binder at the molecular level.

With the aid of a ceramic casting compound which has a polyurethane binder it is possible to produce a very thin ceramic green sheet. The green sheet has mechanical properties which allow further processing of the green sheet (combination of flexibility and tensile strength).

DETAILED DESCRIPTION OF THE INVENTION

The production of the casting compound is explained in more detail on the basis of a number of exemplary embodiments. The way in which the mechanical properties of a ceramic green sheet can be influenced by a composition of the binder is also demonstrated.

According to a first exemplary embodiment, 1300 g of a ceramic powder (Y5V®, Kyorix, Japan) with a mean grain size of 0.4 µm together with 12 g of an ammonium polyacrylate (Byk 154®, Byk Chemie) is dispersed in 300 ml of water by milling for one hour in a ball mill with zirconia balls (diameter 1 mm) as milling medium. With slow stirring, 390 g of a 40% strength aqueous dispersion of an aliphatic polyester/polyurethane copolymer (pH: 7–8.5) are added to this dispersion. The mixture is homogenized by stirring for three hours, during which period 10 g of a wetting agent (SE-F®, Air Products) are additionally introduced. The homogenized casting compound is degassed in vacuo. A viscosity of the casting compound is approximately 24 mPas.

A ceramic green sheet of a thickness of 17 µm is obtained by drawing out, using a film-drawing frame with a corresponding gap width, on a substrate film of polypropylene. The modulus of elasticity of this green sheet is 523.80 MPa, and its maximum tensile strength is 7.36 MPa.

In the same way, it is possible to produce a green sheet with a thickness of 4 µm, which can readily be detached from the substrate film, from the described casting compound.

A further exemplary embodiment differs from the first exemplary embodiment in that a 75:25 mixture of a polyurethane and a polyacrylate is used as binder (pH 8.8–9.2) instead of a polyester/polyurethane copolymer. The minimum film-forming temperature of the casting compound is 18° C. and the viscosity is 0.5 to 1 Pas. In this way, it is possible to increase the tensile strength of a 17 µm thick green sheet to 10.4 MPa. The modulus of elasticity is 930 MPa.

What is claimed is:

1. A ceramic casting compound, which comprises
   a ceramic powder,
   an aqueous dispersion medium, and
   a binder comprising a copolymer of polyurethane and polyacrylate.

2. The casting compound as claimed in claim 1, wherein the binder has a molar weight ranging between 10,000 and 120,000 g/mol.

3. The casting compound as claimed in claim 1, wherein the binder is in the form of a microsphere with a mean particle size ranging between 20 and 300 nm.

4. The casting compound as claimed in claim 1, and having a pH ranging between 5 and 10.

5. The casting compound as claimed in claim 1, wherein the ceramic powder includes barium titanate.

6. A process for producing the ceramic casting compound as claimed in claim 1, the process comprising mixing an aqueous dispersion of a ceramic powder and an aqueous dispersion of a binder comprising a copolymer of polyurethane and polyacrylate.

7. A process for producing a ceramic green sheet comprising depositing the ceramic casting compound as claimed in claim 1 on a substrate film to form a ceramic green sheet having a thickness ranging between 1 and 30 µm; and detaching the ceramic green sheet from the substrate film.

* * * * *